US007966791B2

(12) United States Patent
Napravnik

(10) Patent No.: US 7,966,791 B2
(45) Date of Patent: Jun. 28, 2011

(54) PACKAGING MACHINE FOR PACKS OF BEVERAGE CONTAINERS AND RELATED CONVEYING DEVICE

(75) Inventor: Christian Napravnik, Rosenheim (DE)

(73) Assignee: Krones AG, Neutraubling (DE)

(*) Notice: Subject to any disclaimer, the term of this patent is extended or adjusted under 35 U.S.C. 154(b) by 85 days.

(21) Appl. No.: 12/454,231

(22) Filed: May 14, 2009

(65) Prior Publication Data
US 2010/0126122 A1 May 27, 2010

(30) Foreign Application Priority Data

May 16, 2008 (DE) .................... 10 2008 023 940

(51) Int. Cl.
B65B 53/06 (2006.01)
B65G 15/54 (2006.01)
(52) U.S. Cl. .......................................... 53/557; 198/848
(58) Field of Classification Search .................... 53/557; 198/848
See application file for complete search history.

(56) References Cited

U.S. PATENT DOCUMENTS

| 3,099,118 A * | 7/1963 | Stelling, Jr. ............... 53/557 |
| 3,357,153 A * | 12/1967 | Shaffer ..................... 53/557 |
| 3,386,225 A * | 6/1968 | Arvidson et al. .......... 53/557 |
| 3,448,678 A * | 6/1969 | Burstein ................. 198/848 |
| 3,494,098 A * | 2/1970 | Sternau ................... 53/557 |
| 3,542,633 A * | 11/1970 | Goldsmith ............... 442/29 |
| 3,633,737 A * | 1/1972 | Magaldi .................. 198/848 |
| 3,646,880 A | 3/1972 | Norris ..................... 99/349 |
| 3,695,170 A * | 10/1972 | Ehrenberg ............... 198/848 |
| 3,736,723 A * | 6/1973 | Lattke ..................... 53/557 |
| 3,840,997 A * | 10/1974 | Lucas ..................... 53/557 |
| 4,225,034 A * | 9/1980 | Sarovich ................. 198/607 |
| 4,502,595 A | 3/1985 | Wheeldon ............... 198/853 |
| 4,635,788 A * | 1/1987 | McDonald ............... 198/848 |
| 4,703,566 A * | 11/1987 | Kwoka ................... 198/848 |
| 4,863,419 A * | 9/1989 | Sansone .................. 198/848 |
| 5,009,057 A * | 4/1991 | Wilkinson ............... 53/557 |
| 5,069,331 A * | 12/1991 | Bartkowiak ............. 198/848 |
| 5,360,379 A * | 11/1994 | Carelli et al. ............ 474/260 |
| 5,451,189 A * | 9/1995 | Carelli et al. ............ 474/254 |
| 5,705,446 A * | 1/1998 | Fujishiro et al. ......... 442/260 |
| 2002/0178754 A1* | 12/2002 | Richter ................... 198/848 |
| 2006/0073752 A1* | 4/2006 | Enzien et al. ............. 442/76 |

FOREIGN PATENT DOCUMENTS

| DE | 2436922 A1 * | 2/1976 |
| DE | 3003343 A1 | 8/1981 |
| EP | 630739 A1 * | 12/1994 |
| EP | 0 655 215 A1 | 5/1995 |
| EP | 1281639 A1 * | 2/2003 |
| EP | 1 338 381 B1 | 1/2006 |
| GB | 1 401 237 A | 7/1975 |
| JP | 2002104638 A | 4/2002 |

* cited by examiner

Primary Examiner — Stephen F Gerrity
(74) Attorney, Agent, or Firm — Davidson, Davidson & Kappel, LLC

(57) ABSTRACT

A conveying device and a packaging machine for beverage containers are disclosed. The beverage containers are grouped as packs and wrapped with film, comprising a horizontal conveying device including an endlessly circulating conveyor chain whose movable members and/or meshes each have a supporting structure and contact areas for the packs and/or coatings that include significant portions of PTFE plastic. The contact areas of plastic have a thickness corresponding to at least 10% of the thickness of the supporting structure covered and/or coated therewith.

11 Claims, 7 Drawing Sheets

PACKAGING MACHINE FOR PACKS OF BEVERAGE CONTAINERS AND RELATED CONVEYING DEVICE

CROSS REFERENCE TO RELATED APPLICATIONS

This claims the benefit of German Patent Application No. 10 2008 023 940.2, filed on May 16, 2008 and hereby incorporated by reference herein.

The present invention relates to packaging machine for packs of beverage containers and a conveying device of such a packaging machine.

BACKGROUND

For the packaging of packs of several beverage containers and/or bottles, the beverage containers and/or bottles are grouped on horizontal conveying means and arranged in groups having a defined number of containers. This defined number of grouped containers is usually provided with a film wrapping for more convenient handling so that the packs may be easily transported, stacked and, if necessary, also presented in a sales room in this pack form.

The film wrapping is wrapped around the pack with the help of suitable means and subsequently shrunk by way of heating such that the pack is tightly enclosed by the taut film so that it may be easily transported and handled. In order to heat the film, the packs are usually introduced in a heating chamber, a so-called shrink tunnel, where the temperature is sufficiently high to shrink the film to a desired extent. The high temperatures are usually generated by fan heaters. When passing through the shrink tunnel, the packs are normally positioned on a horizontal conveying means, usually a metal conveyor chain.

When passing through the heating zone, the conveyor belt, e.g. a conveyor chain, absorbs thermal energy, which is at least partially released downstream of the heating zone in order to cool the packs. This results in a quite significant loss of energy from the heated zone, which must be compensated by increased heat supply in the shrink tunnel. On the other hand, the cyclic heating and cooling of the conveyor belt or chain involves the risk that heat stored and not completely released will result in an elevated temperature of the conveyor belt, which might exceed the allowable contact temperature for the film packaging, because the melting temperature thereof may be reached. If, however, the film is softened and/or melted in places, this may result in damage thereto and/or in pieces of film adhering to the conveyor belt.

Applying a suitable coating or wrapping or sheathing to the conveyor belt may reduce the effect of adhering pieces and rests of film. Such a coating and/or wrapping and/or sheathing may, for example, be made of PTFE plastic, as already known from the food industry.

For example, U.S. Pat. No. 3,646,880 shows a cooking means, a so-called cooking grill, comprising a PTFE-coated conveyor belt for positioning food to be cooked thereon. The coating is provided to prevent food to be cooked from adhering to the conveyor belt.

Also, EP 0 655 215 A1 discloses a cooking means having an endless conveyor belt for cooking food thereon. The conveyor belt is used for transporting and simultaneously cooking the food. The conveyor belt consists of a PTFE-coated plastic belt. Again, the coating serves for preventing the food to be cooked from adhering to the conveyor belt.

SUMMARY OF THE INVENTION

It is an object of the present invention to provide a conveying device and a packaging machine for packs of bottles and beverage containers overcoming the shortcomings of prior art and allowing an energy-saving operation.

The present invention relates to a conveying device for beverage containers that are grouped as packs and wrapped with film. The conveying device comprises a horizontal conveyor including an endlessly circulating conveyor chain whose movable members and/or meshes each have a supporting structure of metal or glass fibers and/or aramid fibers or other suitable fibers as well as contact areas for the packs and/or coatings (and/or wrappings and/or sheathings) that include significant portions of PTFE plastic. At least the contact areas of plastic have a thickness corresponding to at least 10% of the thickness of the supporting structure covered and/or coated therewith. Optionally, the contact areas of plastic may also have a thickness corresponding to 35% or more of the thickness of the supporting structure covered and/or coated therewith.

A useful value for the thickness of the contact areas may be at least 0.1 mm. Preferably, however, the contact areas have a thickness of about 0.3 mm or more.

The pack-bearing areas of the supporting structures of the conveying means may each have a thickness of at least 1.4 mm, if necessary also of 2 mm or more. These supporting structures may preferably be made of metal, particularly steel wire, or glass and/or aramid fibers.

By combining the metal and/or glass or aramid fiber supporting structure having a thickness of about 1.4-2 mm or more and the contact areas and/or covers of PTFE plastic covering them at least in the areas of the contact surfaces for the packs, there may be provided a conveying means that has a very low thermal conductivity with respect to the environment and a low heat storage capacity and thus allows a highly energy-saving operation. Since the sheathing may additionally bear part of the mechanical stress imposed on the conveyor belt, the supporting structure may be made thinner, if necessary, resulting in less heat storage capacity. As thermal treatment of products by means of a fluid, particularly hot air, considerably heats the conveyor belts together with the products moved thereon, for example when passing through a hot air oven, energy is not only absorbed by the packs, but the conveyor belt also absorbs energy in the form of heat when passing through this zone and releases it downstream of the heated zone and/or during the return run. This results in a loss of energy from the heated zone. This loss of energy may be reduced with the help of the inventive conveying device with its suitable geometric design and suitable choice of material for the conveyor belt.

The food industry uses conveyor belts specifically adapted to the respective production conditions. Conveyor belts of a more delicate design absorb less energy. It is also useful to coat the conveyor belts with plastic in order to reduce the tendency to adhere to the product or to emboss products. A particularly suitable coating material is PTFE plastic. However, the thickness of the coating as compared to the thickness of the carrier material is important for energy-related considerations and design, because the energy absorption of the conveyor belt with coating will be higher than without any coating if the applied coating is too thin. For this reason, the thickness of the PTFE coating must be chosen to be at least 10% of the thickness of the material of the supporting structure and/or the carrier material in the inventive transporting device in order to obtain the required thermal insulation and thus the desired saving of energy. For example, at least 15% of energy were shown to be saved with a wire or fiber thickness of about 1.6 mm and an additional thickness of about 0.4 mm for the PTFE coating due to reduced heat storage effects in the conveyor belt. The energy saved depends on various parameters, such as the air temperature in the shrink channel, the conveying speed and thus the heat exposure time, the air speed of the hot air blower, etc. Correspondingly, a thicker coating may further reduce the thermal conductivity of the conveying device with respect to the environment and thus result in a better energy-saving effect.

In order to improve the abrasion resistance and the mechanical stability of the coating, the contact areas may be made of a composite material including PTFE plastic and reinforcing fibers embedded therein. The conveyor chain may, for example, have a net-like structure. The use of glass and/or aramid fiber fabric is energetically more advantageous in comparison with metal, because both the thermal conductivity and the weight-related heat capacity are significantly reduced as compared to steel.

A further embodiment regarding metal support structures is using PTFE reinforced by glass fibers as contact areas and/or coatings (wrapping, sheathing), in order to improve the mechanical properties of PTFE, e.g. the abrasion resistance. The reinforcement with glass fibers is not achieved with fiber fabric, but by mixing short glass fibers into the PTFE-melt. The proportion of these glass fibers may be, e.g., 25% or higher.

The invention further relates to a packaging machine for beverage containers that are grouped as packs and wrapped with film, comprising a heating channel for heating the film wrapped around the packs and for shrinking the film, and a horizontal conveying device for the packs passing through the heating channel, the device including an endlessly circulating conveyor chain whose movable members and/or meshes each have a supporting structure preferably of metal or glass and/or aramid fiber fabric as well as contact areas for the packs and/or coatings that include significant portions of PTFE plastic. It is again provided that the contact areas of plastic have a thickness corresponding to at least 10% of the thickness of the supporting structure covered and/or coated therewith.

In order to be able to estimate the heat transfer effects between the various materials used, it is useful to calculate with the so-called Péclet equation, which represents the relationship between the convectively and conductively transferred amounts of heat in thermodynamics. In this context, the Biot number can be maximized. This Biot number (Bi in the formula) represents the ratio between the external heat transfer, i.e. the heat transport from the surface to the surrounding medium, and the internal heat transfer, i.e. the heat conduction through the body. It is useful to choose a value of at least 1.0 for the Biot number so that:

$$Bi = (2 * \alpha * r)/\lambda \geq 1.0$$

wherein:
Bi is the Biot number of the wire or fiber configuration,
$\alpha$ is the convective heat transfer resistance of the surface,
r is the radius of the metal wire or fiber, and
$\lambda$ is the thermal conductivity of the insulating material.

The convective heat transfer resistance of the surface can be given by the process and the wire or fiber diameter, the thermal conductivity of the insulating material is given by the jacket material. If the Biot number is smaller than 1, the loss will initially rise despite increased insulation thickness so that there will only be an insulating effect if the dimensionless heat flow of the curve corresponding to the Biot number assumes values less than 1. For example, with a Biot number of 0.5, saving energy is only possible if the thickness of the insulation is twice as thick as the diameter of the bare wire and/or the uninsulated fiber fabric. If, however, the Biot number exceeds 1, the insulation will immediately have an energetically positive effect.

BRIEF DESCRIPTION OF THE DRAWINGS

Further features, objects and advantages of the present invention will be explained in the following detailed description of preferred embodiments of the invention, which serve as non-limiting examples and refer to the accompanying drawings. Equal elements basically have the same reference numerals and repeated explanations are sometimes omitted.

In the drawings.

DETAILED DESCRIPTION

Figure 1:
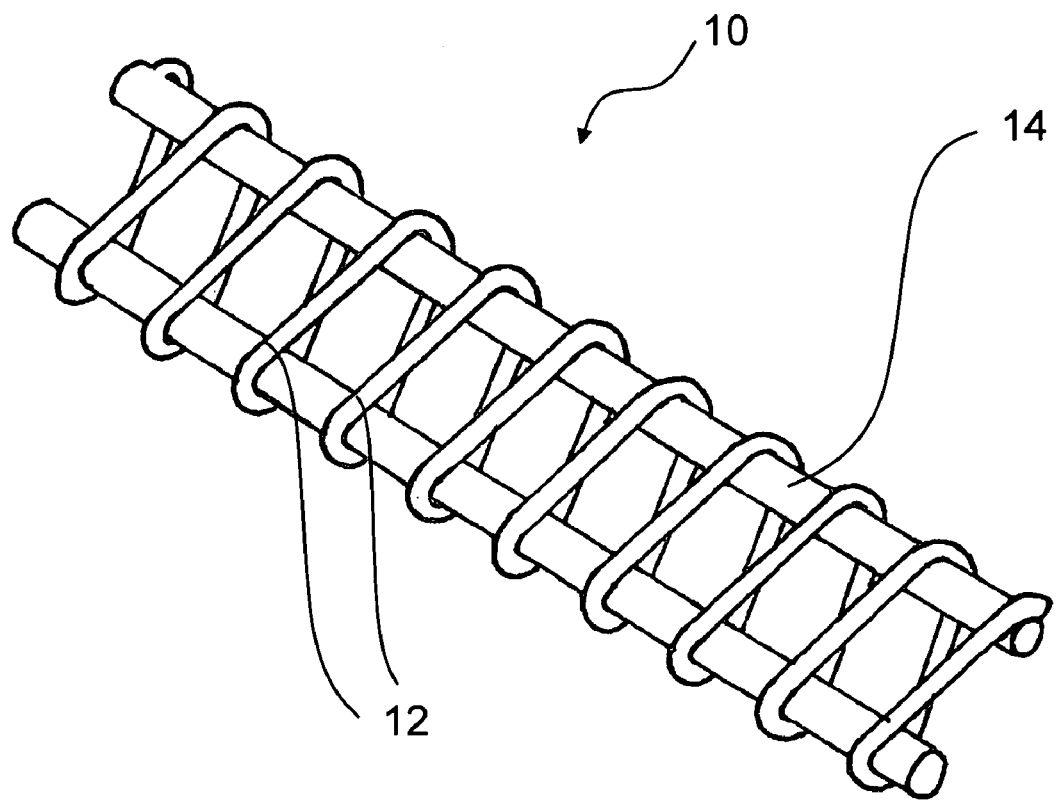
FIG. 1 shows a perspective detail-view of an embodiment of a conveyor chain of an inventive conveying device, wherein the supporting structure is metal.
Figure 5:
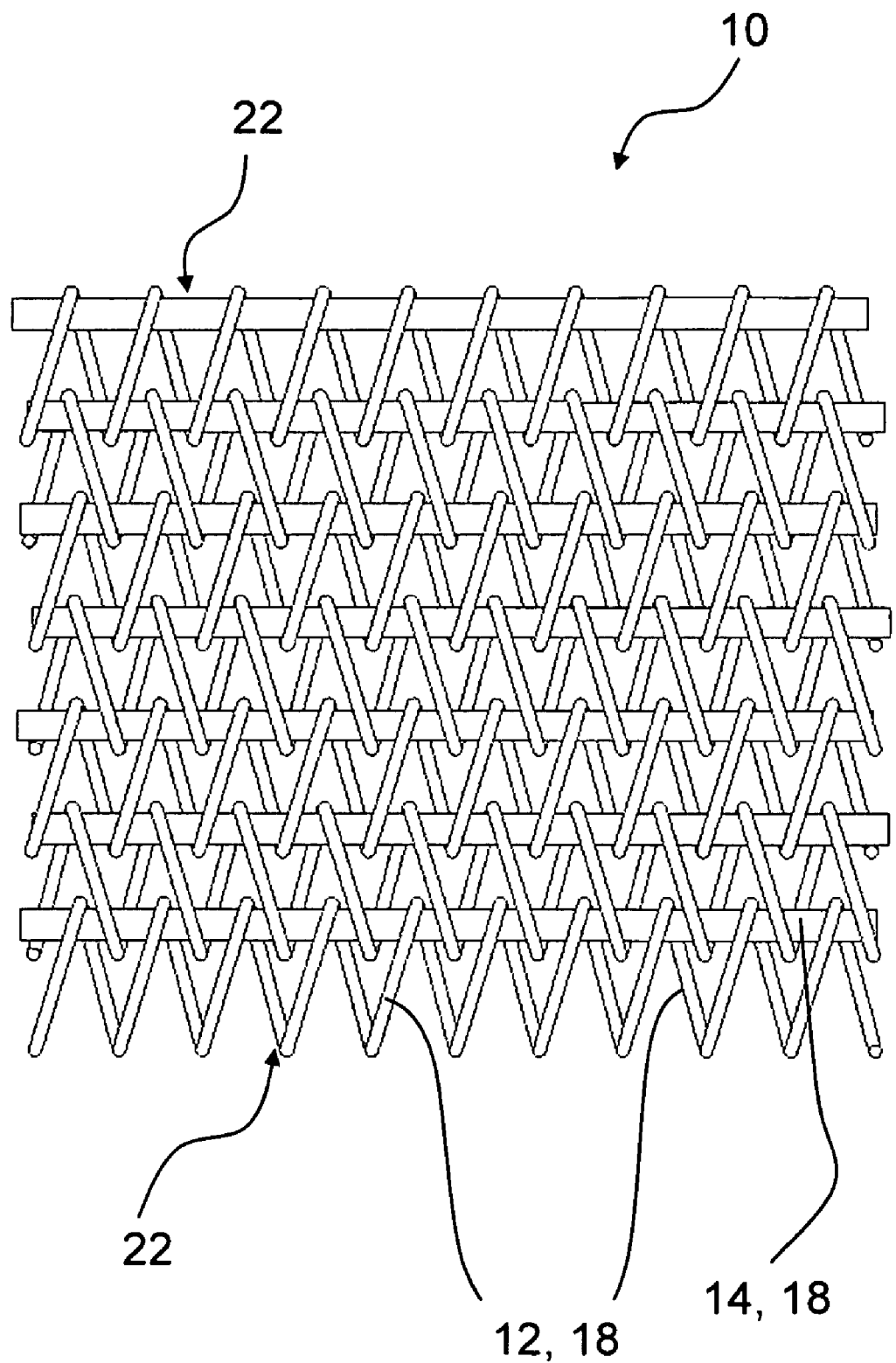
FIG. 5 shows a topview of a larger section of the conveyor chain according to FIG. 1.

The schematic illustrations of FIGS. 1 and 5 show a perspective detail-view and top-view of an embodiment of a conveyor belt 10 of an inventive conveying device. The conveyor belt 10 is made of metal wire, for example steel wire, which is covered with PTFE plastic of a defined thickness and processed to form a meshed belt. The illustrations of FIGS. 1 and 5 show an exemplary geometry of the belt 10, which may obviously have a large number of different designs (see for example FIGS. 6 to 9). The supporting structure 22 of the conveyor belt 10 comprises a thinner winding wire 12 which is supported by transverse wires 14. The top level points of the thinner winding wire 12 and transverse wires 14 form the contact areas 18 for the packs being transported.

Figure 6:
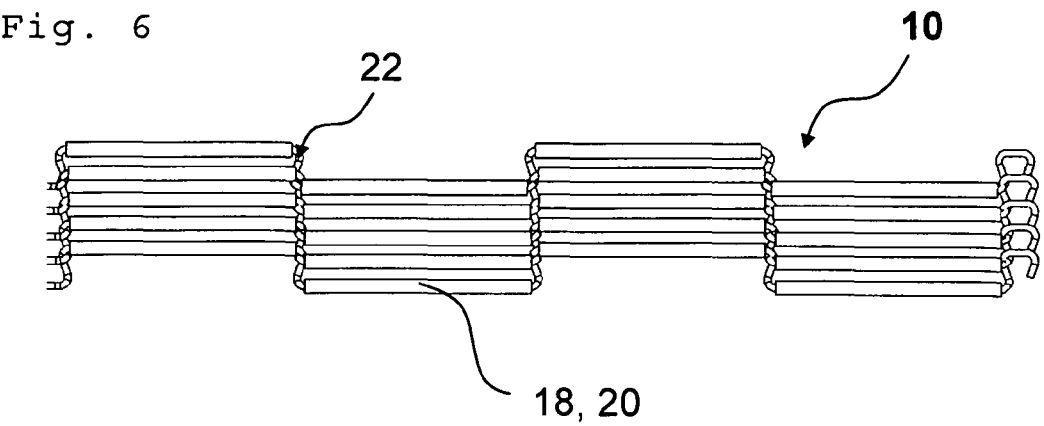
FIG. 6 shows a topview of another embodiment of a conveyor chain of the inventive conveying device, wherein the support structures are of metal with coatings made of PTFE.
Figure 7:
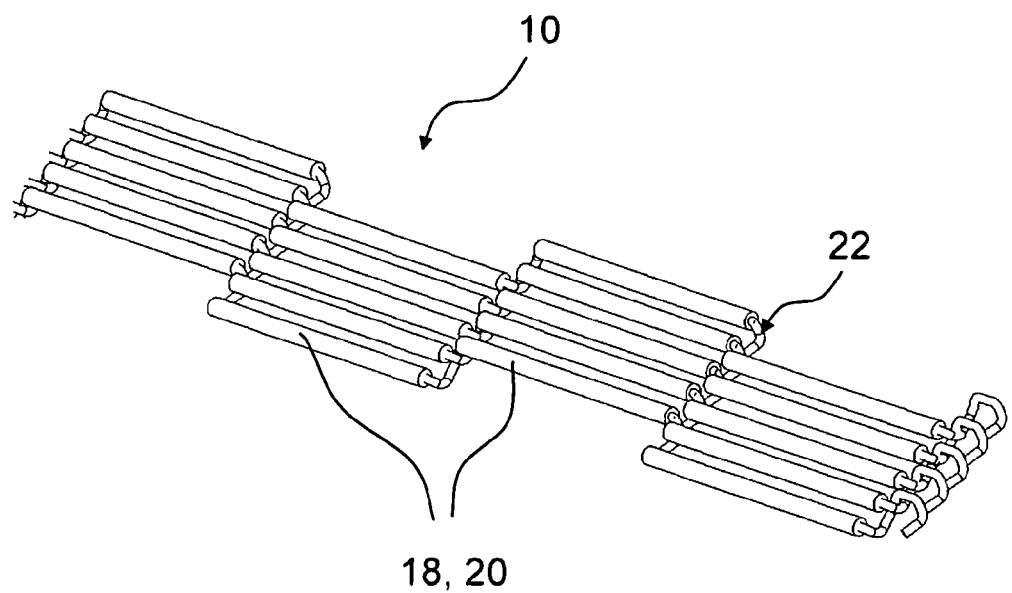
FIG. 7 shows a perspective view of the conveyor chain according to FIG. 6.

The schematic illustrations of FIGS. 6 and 7 show a conveyor chain 10 with a different geometry of the supporting structure 22 compared to FIGS. 1 and 5. The supporting structure 22 of conveyor chain 10 is also of metal. The contact areas 18 of the supporting structure 22 are formed by the top-level points of coatings 20. The coatings 20 are made of a PTFE-material and arranged around portions of the supporting structure being of metal.

Figure 8:
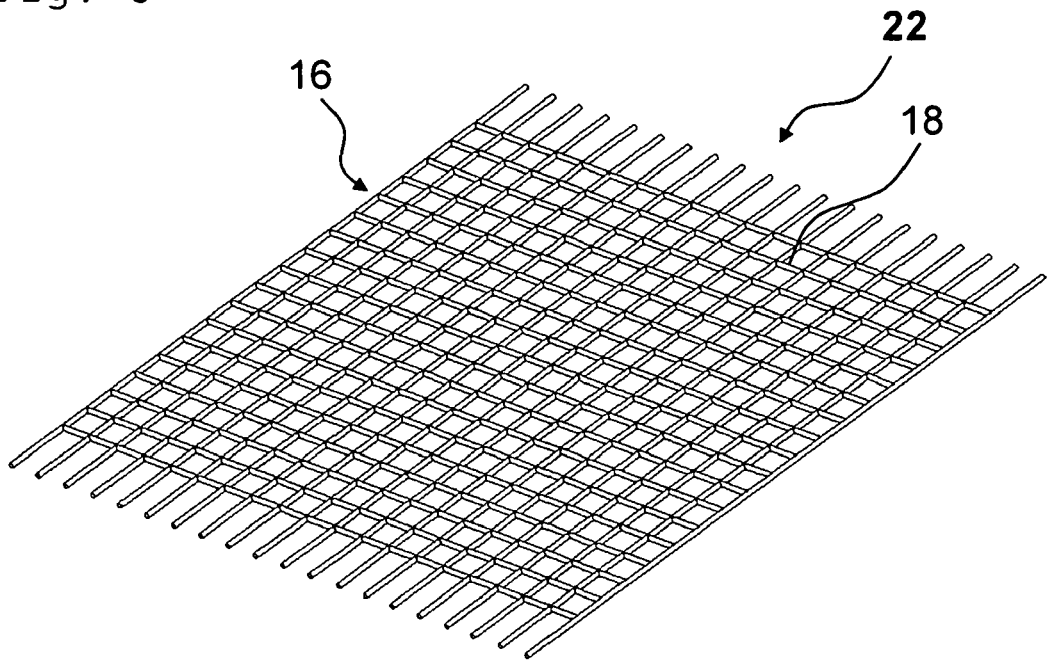
FIG. 8 shows a perspective view of another embodiment of a conveyor chain of the inventive conveying device, wherein the support structures are made of glass fiber fabric or aramid fabric including one layer with PTFE-contact areas.
Figure 9:
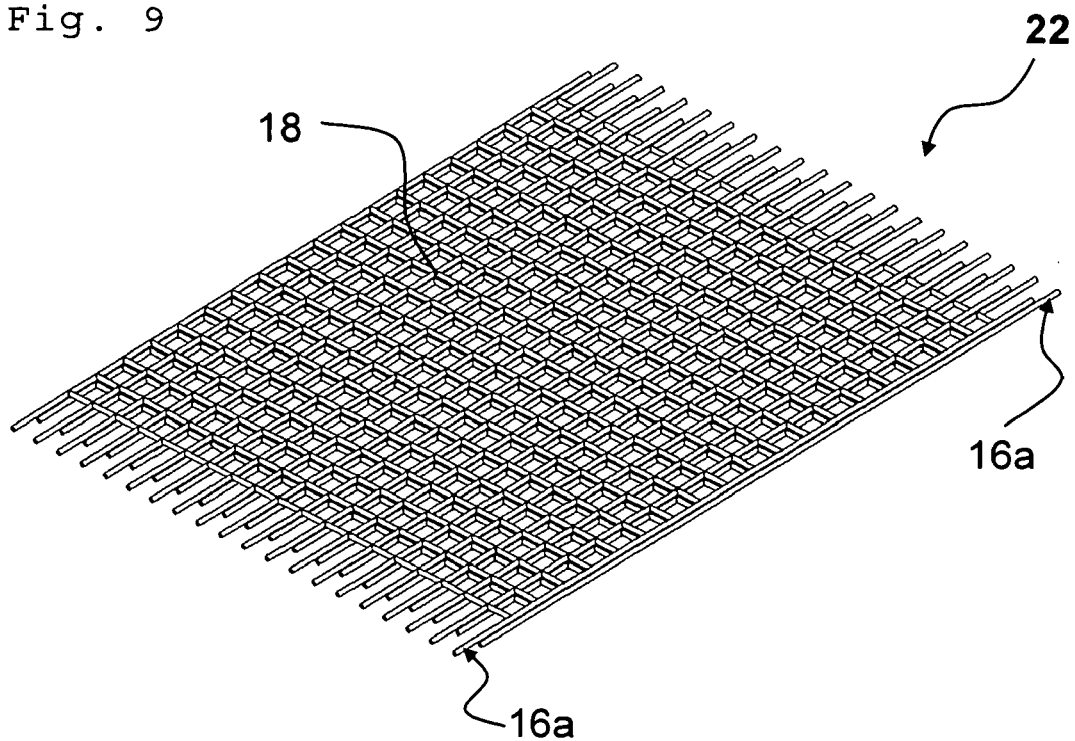
FIG. 9 shows a perspective view of a further embodiment of a conveyor chain of the inventive conveying device, wherein the support structures are made of several layers of glass fiber fabric or aramid fabric with PTFE-contact areas.

The schematic illustrations of FIGS. 8 and 9 show two further embodiments of a supporting structure 22 of the inventive conveying device. The supporting structure 22 comprises a glass fiber fabric. In FIG. 8 the supporting structure 22 comprises only one layer 16 of fabric, the top-level points thereof forming a contact area 18. In FIG. 9 the supporting structure 22 comprises a lower layer 16a and an upper layer 16b of the fabric. The top-level points of the upper layer 16b form a contact area 18 for the packs being transported thereon. In both embodiments of FIGS. 8 and 9 the contact areas 18 are PTFE-coatings. Therefore, the glass or aramid fiber fabric is also PTFE-coated. Instead of only one or two layers, more than two layers 16 can be provided (not shown). The supporting structures 22 of FIGS. 8 and 9 are grid-structures different from the geometries shown in FIG. 1, 5, 6, 7.

Figure 2:
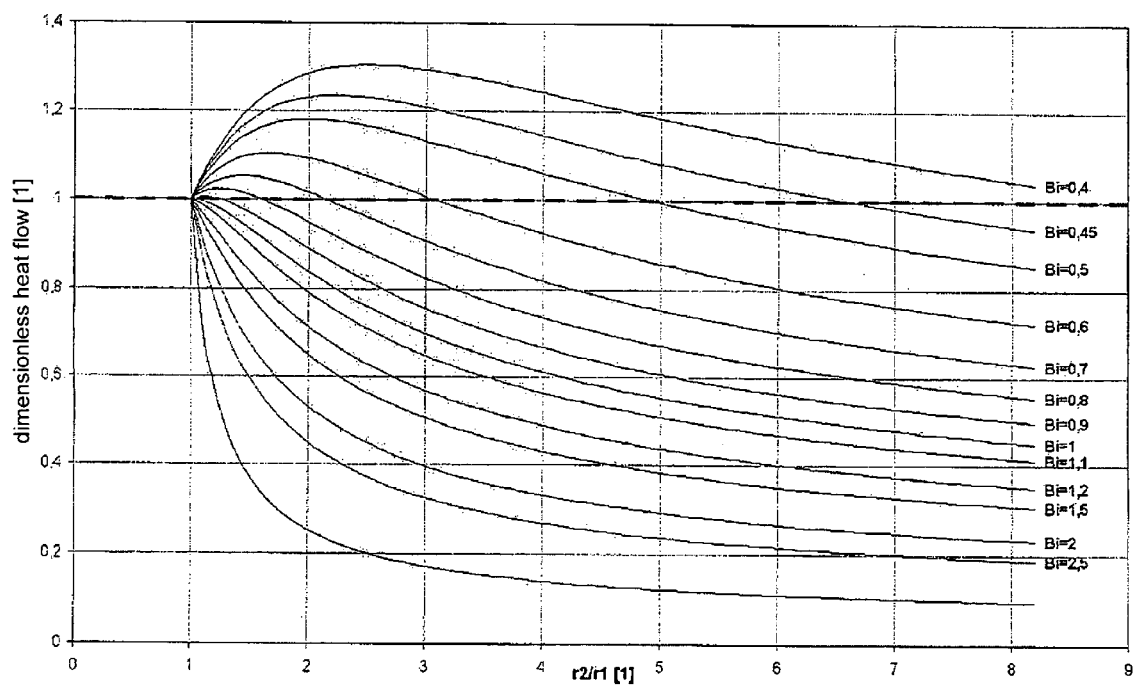
FIG. 2 shows a graph illustrating the relationship between the wire/coating or fiber diameter ratio and heat flow for various Biot numbers.

The graph in FIG. 2 shows how the dimensionless heat loss rate, i.e. the energy loss caused by the conveyor chain 10, depends on the Biot number of the wire or fiber configuration. The diameter ratio r2/r1 is plotted on the abscissa of the diagram. r1 represents the wire or fiber radius without cover, and r2 represents the outer radius of the wire or fiber including an insulation and/or cover. The dimensionless heat flow is plotted on the ordinate of the diagram. The diagram shows that, for Biot numbers smaller than 1, the loss will initially rise despite increased insulation thickness, and that there will only be an insulating effect if the dimensionless heat flow of the curve corresponding to the Biot number assumes values less than 1. Thus, with an exemplary Biot number of 0.5, saving energy is only possible if the thickness of the insulation corresponds to twice the thickness of the bare wire. For Biot numbers exceeding 1, however, an insulation of any chosen thickness has a significant energetically positive effect.

For a wire and/or fiber fabric thickness of, for example, D=1.6 mm and a convective heat transfer resistance of the surface of, for example, 145 W/m²K (process-dependent), the Biot number will be about Bi=0.9 for a PTFE insulation ($\lambda$PTFE=0.26 W/mK). This means that an insulation will only be energetically advantageous if it has a thickness of about 0.25 mm or more. A thinner insulation will have less advantageous energetic values than the bare wire and/or the uninsulated fiber fabric.

Figure 3:
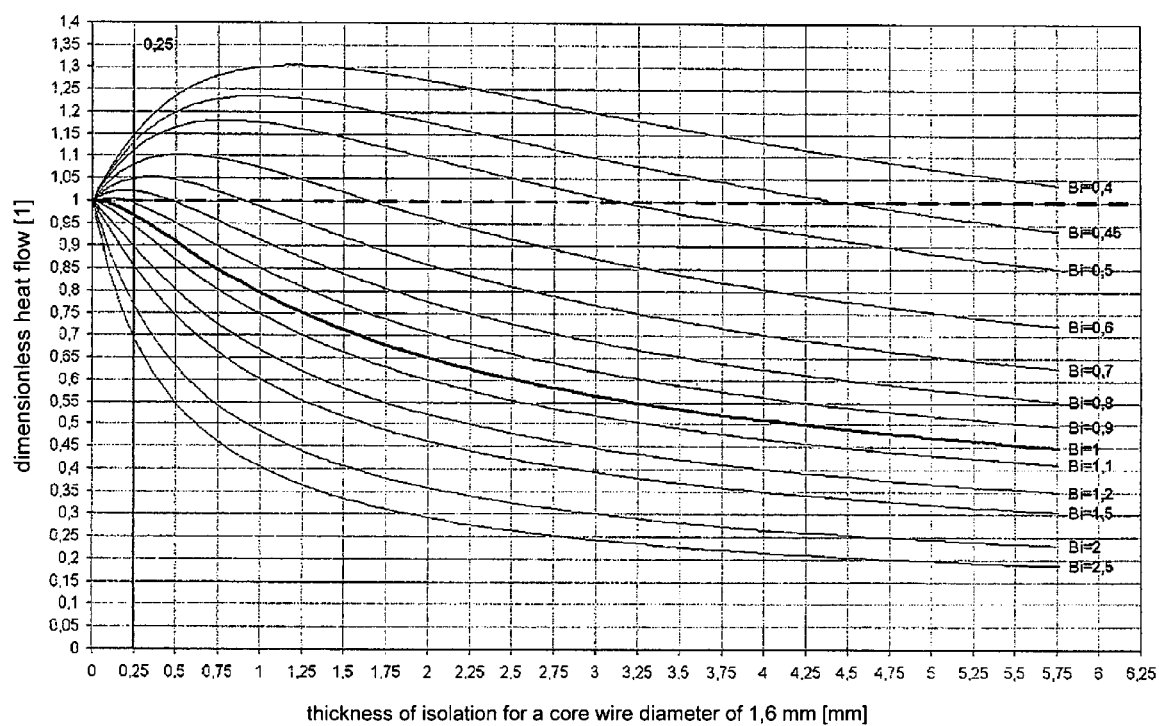
FIG. 3 shows a graph illustrating the relationship between the insulation thickness for a core wire diameter or fiber diameter of 1.6 mm and heat flow for various Biot numbers.

The graph of FIG. 3 shows how the saving of energy depends on the thickness of the insulation for various Biot numbers for a core wire diameter or core fiber diameter of 1.6 mm. Since the insulation is supposed to significantly improve the energy situation to justify the increased costs of the conveyor belt, which can be considered as achieved if the energy consumption is reduced by at least 15%, the thickness of the insulation may be increased until the desired amount of energy is saved. In the example shown, the coating thickness is about 1.0 mm so that the overall diameter of the insulated wire or fiber is 3.6 mm.

Figure 4:
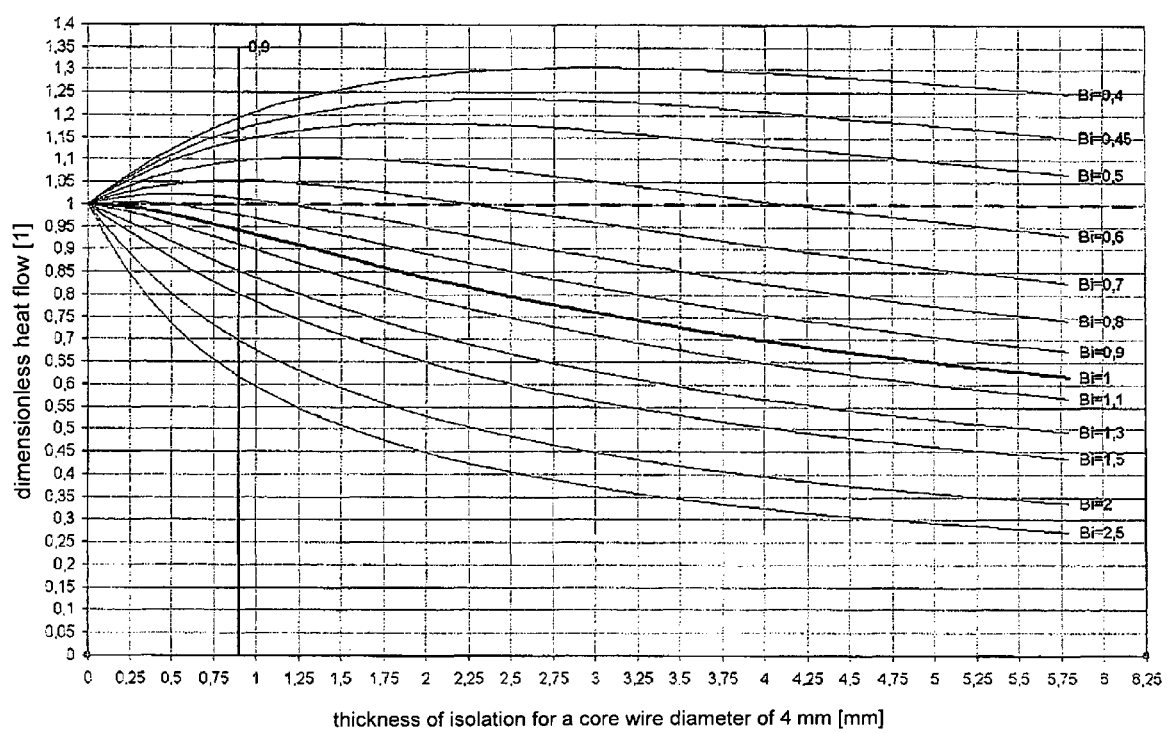
FIG. 4 shows a graph illustrating the relationship between the insulation thickness for a core wire diameter or fiber diameter of 4 mm and heat flow for various Biot numbers.

FIG. 1 shows that the thinner winding wire 12 of the conveyor chain 10 is supported by transverse wires 14. Since these transverse wires 14 are thicker, the Biot number is Bi=1.3 for a thickness of about 4 mm if the flow situation is the same. This means that an insulating layer with a thickness of 0.9 mm is sufficient to improve the energy situation by 15%. This relation is shown by the graph of FIG. 4.

FIGS. 8 and 9 illustrate that the fiber fabric supporting structures 22 do not require any supporting wires and do therefore have less weight than metal supporting structures 22 (FIG. 1, 5, 6, 7). The weight-reduction and the fact that glass or aramid fiber fabric has less thermal conductivity compared to metal and less weight-related heat capacity of fiber fabric supporting structures 22 effect energy-savings.

The invention is not limited to the above embodiments. There may be devised a large number of variants and modifications that make use of the inventive concept and therefore fall within its scope.

Finally, it should be noted in particular, that the previously described exemplary embodiments, only serve to describe the teachings claimed, and are not limiting to the exemplary embodiments. It is conceivable however for someone skilled in the art, that variations and modifications of the invention can be made without departing from the scope of protection of the appended claims.

What is claimed is:

1. A conveying device for beverage containers grouped as packs and wrapped with a film, comprising:
    a horizontal conveyor including an endlessly circulating conveyor chain, the circulating conveyor chain including movable members and/or meshes, a supporting structure for the packs being provided by the movable members and/or meshes and defining contact areas and/or coatings for the packs, wherein the contact areas and/or coatings include significant portions of PTFE plastic, the contact areas and/or coatings of plastic having a thickness corresponding to at least 10% of the thickness of the supporting structure covered and/or coated therewith;
    the conveyor chain and the contact areas and/or coatings having a plurality of openings, the openings permitting film wrapping the beverage containers to contact hot air during a shrinking of the film, the supporting structure having a Biot number equal to $2*\alpha*r/\lambda$ and being equal to or greater than 1.0, where $\alpha$ is a convective heat transfer resistance of a surface of the supporting structure, r is a radius of the supporting structure, and $\lambda$ is the thermal conductivity of the contact areas and/or coatings of the supporting structure.

2. The conveying device of claim 1, wherein the supporting structure is made of metal or glass fiber fabric or aramid fabric.

3. The conveying device of claim 1, wherein the contact areas and/or coatings have a thickness of at least 0.1 mm.

4. The conveying device of claim 3, wherein the contact areas and/or coatings have a thickness of at least 0.3 mm.

5. The conveying device of claim 1, wherein the contact areas and/or coatings are formed of a composite material including PTFE plastic and reinforcing fibers embedded therein.

6. The conveying device of claim 1, wherein the supporting structures each have a thickness of at least 1.4 mm.

7. The conveying device of claim 1, wherein the supporting structures are made of steel wire.

8. The conveying device of claim 1, wherein pack-bearing areas of the supporting structures are made of metal and each have a thickness of at least 2 mm.

9. The conveying device of claim 1, wherein the conveyor chain has a net-like structure.

10. The conveying device of claim 1, wherein the conveyor chain includes several layers.

11. A packaging machine for beverage containers grouped as packs and wrapped with film, comprising:
    a heating channel for heating the film wrapped around the packs and for shrinking the film, a horizontal conveyor for the packs passing through the heating channel and including an endlessly circulating conveyor chain having movable members and/or meshes, a supporting structure for the packs being provided by the movable members and/or meshes and defining contact areas and/or coatings for the packs, wherein the contact areas and/or coatings include significant portions of PTFE plastic, the contact areas and/or coatings of plastic having a thickness corresponding to at least 10% of the thickness of the supporting structure covered and/or coated therewith;

the conveyor chain and the contact areas and/or coatings having a plurality of openings, the openings permitting film wrapping the beverage containers to contact hot air during a shrinking of the film, the supporting structure having a Biot number equal to $2*\alpha*r/\lambda$ and being equal to or greater than 1.0, where $\alpha$ is a convective heat transfer resistance of a surface of the supporting structure, r is a radius of the supporting structure, and $\lambda$ is the thermal conductivity of the contact areas and/or coatings of the supporting structure.

\* \* \* \* \*